United States Patent
Shih et al.

(10) Patent No.: US 9,569,006 B2
(45) Date of Patent: Feb. 14, 2017

(54) ULTRASOUND-BASED METHODS FOR TOUCHLESS GESTURE RECOGNITION, AND APPARATUSES USING THE SAME

(71) Applicant: MediaTek Inc., Hsin-Chu (TW)

(72) Inventors: Xin-Wei Shih, Changhua (TW); Chao-Ling Hsu, Hsinchu (TW); Shaw-Min Lei, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/644,407

(22) Filed: Mar. 11, 2015

(65) Prior Publication Data

US 2015/0293599 A1    Oct. 15, 2015

Related U.S. Application Data

(60) Provisional application No. 61/977,687, filed on Apr. 10, 2014.

(51) Int. Cl.
G06F 3/041    (2006.01)
G06F 3/01     (2006.01)
G06F 3/0484   (2013.01)

(52) U.S. Cl.
CPC ........... *G06F 3/017* (2013.01); *G06F 3/04847* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 2012/0206339 A1* | 8/2012 | Dahl | G06F 3/043 345/156 |
| 2015/0185963 A1* | 7/2015 | Lee | G06F 3/0433 345/177 |

* cited by examiner

*Primary Examiner* — Joseph Haley
(74) *Attorney, Agent, or Firm* — McClure, Qualey & Rodack, LLP

(57) ABSTRACT

A portable electronic device including an ultrasound transmitter, an ultrasound receiver, and a processing unit is provided. The ultrasound transmitter sends ultrasonic signals, while the ultrasound receiver receives reflected ultrasonic signals from an object. The ultrasound transmitter and the ultrasound receiver are disposed to form a reference axis. The processing unit processes the reflected ultrasonic signals to obtain a time-frequency distribution thereof, and determines a 1D gesture corresponding to projection loci of movements of the object on the reference axis according to the time-frequency distribution.

26 Claims, 18 Drawing Sheets

ULTRASOUND-BASED METHODS FOR TOUCHLESS GESTURE RECOGNITION, AND APPARATUSES USING THE SAME

CROSS REFERENCE TO RELATED APPLICATIONS

This Application claims priority of U.S. Provisional Application No. 61/977,687, filed on Apr. 10, 2014, the entirety of which is incorporated by reference herein.

BACKGROUND OF THE INVENTION

Field of the Invention

The invention generally relates to gesture recognition, and more particularly, to ultrasound-based methods for touchless gesture recognition and apparatuses using the same.

Description of the Related Art

To an increasing extent, screens are being used as an alternative way for users to interact with portable electronic devices, such as touch books, mobile phones, panel Personal Computers (PCs), media player devices, and gaming devices. In addition to providing a basic display function, a screen further comprises one or more touch sensors for detecting the contact of objects thereon, thereby providing a touch-based User Interface (UI). Generally, the touch-based UI requires minimal training and simplifies device operation with intuitive gestures.

However, there may be situations where direct contact on the touch-based UI is not preferred or not feasible. For example, the user may be holding something in each hand, or both hands of the user are greasy or in gloves, or the portable electronic device may be too far away for the user to comfortably reach the screen, or the screen of the portable electronic device may be too big for a user to conveniently touch its entire surface, or the display surface of the portable electronic device may simply be untouchable, e.g., in the case of a projector display. To solve this problem, most practices propose to introduce one or more optical devices, such as camera devices and infrared sensors, for identifying touchless gestures (i.e., gestures without direct contact on any part of the portable electronic device) according to the captured images.

However, the requirement of additional optical devices may considerably increase the cost of hardware, not to mention that always keeping the optical devices on to detect touchless gestures would be very power consuming, which is a huge disadvantage since the power of a portable electronic device is usually quite limited. Thus, it is desirable to have an alternative way of touchless gesture recognition that is more efficient, at least regarding hardware cost and power consumption.

BRIEF SUMMARY OF THE INVENTION

In one aspect of the invention, a portable electronic device is provided. The portable electronic device comprises a first ultrasound transmitter, a first ultrasound receiver, and a processing unit. The first ultrasound transmitter sends ultrasonic signals. The first ultrasound receiver receives reflected ultrasonic signals from an object. The first ultrasound transmitter and the first ultrasound receiver are disposed to form a reference axis. The processing unit processes the reflected ultrasonic signals to obtain a time-frequency distribution thereof, and determines a 1D gesture corresponding to projection loci of movements of the object on the reference axis according to the time-frequency distribution.

In another aspect of the invention, an ultrasound-based method for touchless gesture recognition by a portable electronic device is provided. The ultrasound-based method comprises the steps of: sending ultrasonic signals via a first ultrasound transmitter; receiving reflected ultrasonic signals from an object via a first ultrasound receiver, wherein the first ultrasound transmitter and the first ultrasound receiver are disposed to form a reference axis; processing the reflected ultrasonic signals to obtain a time-frequency distribution thereof; and determining a 1D gesture corresponding to projection loci of movements of the object on the reference axis according to the time-frequency distribution.

Other aspects and features of the invention will become apparent to those with ordinary skill in the art upon review of the following descriptions of specific embodiments of the portable electronic device and the ultrasound-based method for touchless gesture recognition.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
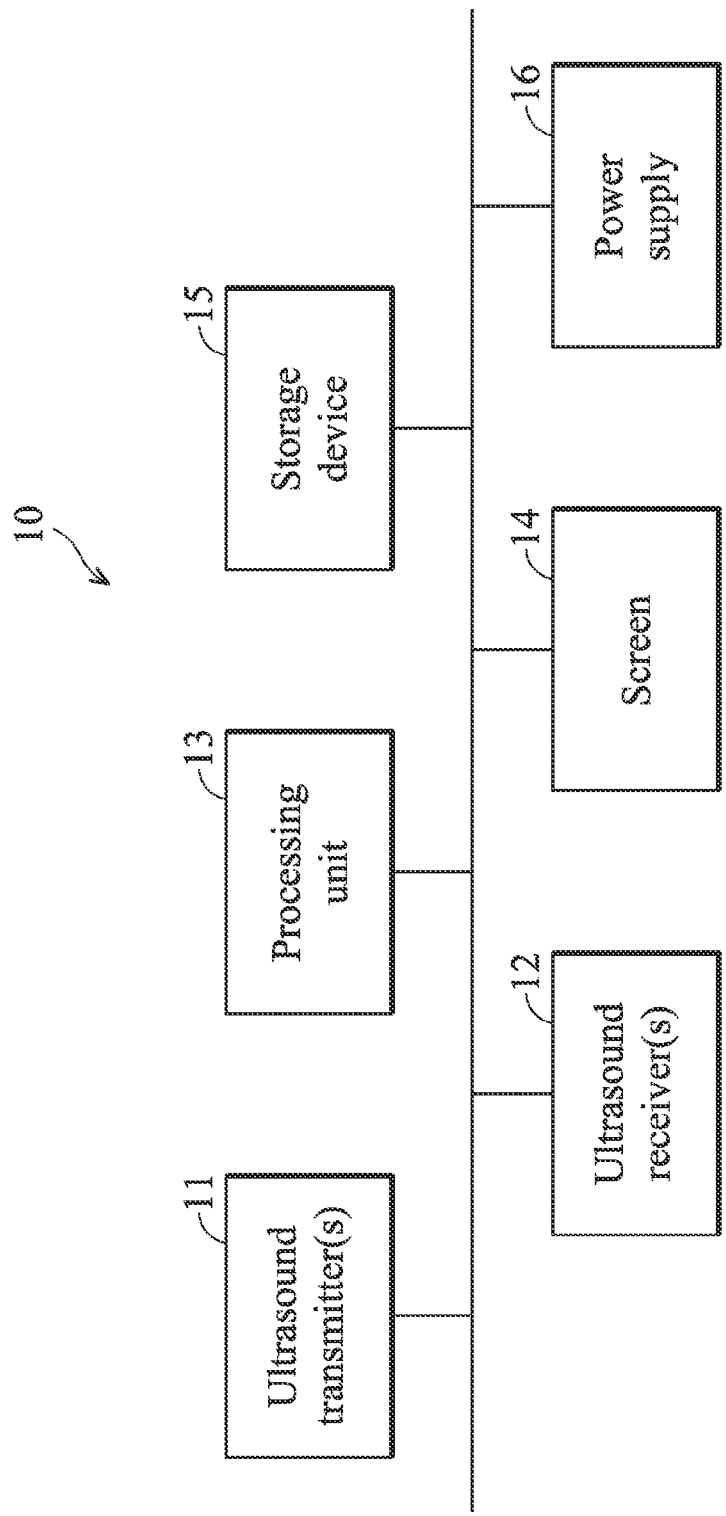
FIG. 1 is a block diagram of a portable electronic device according to an embodiment of the invention.

FIG. 1 is a block diagram of a portable electronic device according to an embodiment of the invention. The portable electronic device 10 may be a touch book, mobile/smart phone, panel PC, Portable Media Player (PMP), global positioning system (GPS) navigation device, portable gaming console, and so on. The portable electronic device 10 comprises one or more ultrasound transmitters 11, one or more ultrasound receivers 12, a processing unit 13, a screen 14, a storage device 15, and a power supply 16. The ultrasound transmitter(s) 11 is configured to transmit ultrasonic signals, while the ultrasound receiver 12(s) is configured to receive reflected ultrasonic signals from an object, such as the user's hand or a handheld item. Ultrasound is a cyclic sound pressure defined as operating at frequencies above the upper limits of human hearing, or above approximately 20 KHz. Specifically, the ultrasound transmitter(s) 11 may be a speaker or transducer capable of emitting audio signals in the ultrasound spectrum, and the ultrasound receiver(s) 12 may be a microphone capable of sensing reflected audio signals in the ultrasound spectrum.

The processing unit 13 may be a general-purpose processor, a Micro-Control Unit (MCU), a Digital Signal Processor (DSP), or another type of processor, which provides the function of data processing and computing of the reflected ultrasonic signals received by the ultrasound receiver(s) 12, and loads and executes a series of instructions and/or program codes from the storage device 15 to perform the ultrasound-based method of the invention for touchless gesture recognition, and/or controls the operation of the ultrasound transmitter(s) 11, the ultrasound receiver(s) 12, and the screen 14.

The screen 14 may be a Liquid-Crystal Display (LCD), Light-Emitting Diode (LED) display, or Electronic Paper Display (EPD), etc., for providing display functionality. Alternatively, the screen 14 may further comprise one or more touch sensors (not shown) disposed thereon or thereunder for providing touch-detection function, wherein the touch-detection function may include resistive type, capacitive type, or other types of touch detection.

The storage device 15 may be a memory (e.g., Random Access Memory (RAM), Flash memory, or Non-Volatile Random Access Memory (NVRAM), etc.), a magnetic storage device (e.g., magnetic tape or hard disk), an optical storage device (e.g., Compact Disc Read-Only Memory (CD-ROM)), or any combination thereof for storing data, such as instructions, and program codes.

The power supply 16 may be a portable/replaceable and chargeable battery, which provides power to the other functional units, including the ultrasound transmitter(s) 11, the ultrasound receiver(s) 12, the processing unit 13, the screen 14, and the storage device 15, and allows portability of the portable electronic device 10.

Although not shown, the portable electronic device 10 may further comprise other functional units, such as a Radio Frequency (RF) unit and a Baseband unit for wireless communications, and/or an Input/Output (I/O) device, e.g., button, keyboard, mouse, or touch pad, etc., and the invention is not limited thereto. Taking the portable electronic device 10 being a mobile/smart phone as an example, the Baseband unit may contain multiple hardware devices to perform baseband signal processing, including Analog-to-Digital Conversion (ADC)/Digital-to-Analog Conversion (DAC), gain adjusting, modulation/demodulation, encoding/decoding, and so on, while the RF unit may receive RF wireless signals, convert the received RF wireless signals to baseband signals, which are processed by the Baseband unit, or receive baseband signals from the Baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless communications system, wherein the radio frequency may be 900 MHz, 1800 MHz or 1900 MHz utilized in Global System for Mobile communications (GSM) systems, or may be 900 MHz, 1900 MHz or 2100 MHz utilized in Wideband Code Division Multiple Access (WCDMA) systems, or may be 900 MHz, 2100 MHz, or 2.6 GHz utilized in Long Term Evolution (LTE)/LTE-Advanced technology, or others depending on the Radio Access Technology (RAT) in use.

It should be understood that the components described in the embodiment of FIG. 1 are for illustrative purposes only and are not intended to limit the scope of the present application.

Figure 2:
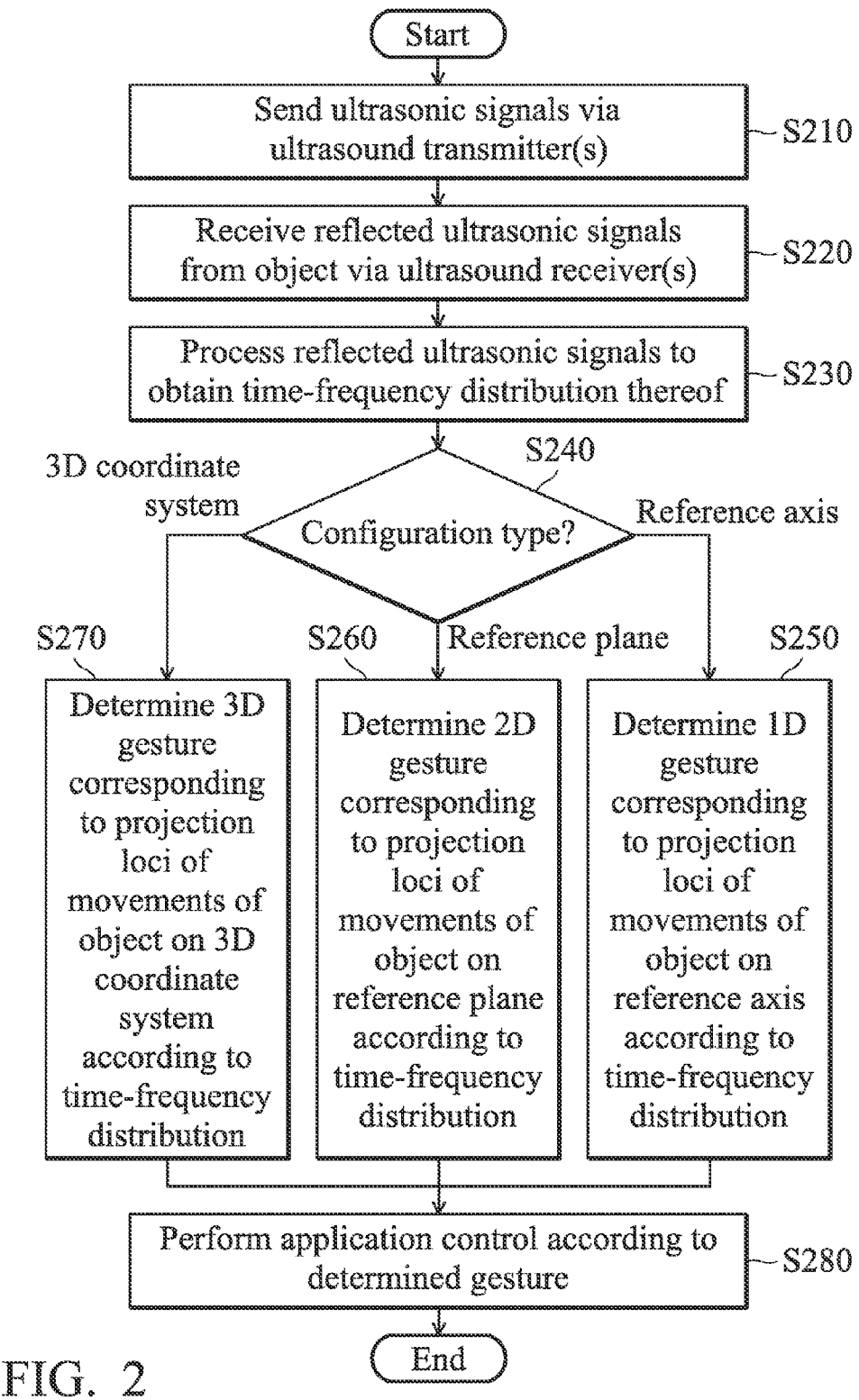
FIG. 2 is a flow chart illustrating the ultrasound-based method for touchless gesture recognition according to an embodiment of the invention.

FIG. 2 is a flow chart illustrating the ultrasound-based method for touchless gesture recognition according to an embodiment of the invention. In this embodiment, the ultrasound-based method is applied to a portable electronic device comprising one or more ultrasound transmitters and one or more ultrasound receivers. To begin, the portable electronic device sends ultrasonic signals via the ultrasound transmitter(s) (step S210), and then receives reflected ultrasonic signals from an object via the ultrasound receiver(s) (step S220). Next, the portable electronic device processes the reflected ultrasonic signals to obtain a time-frequency distribution thereof (step S230). The processing of the reflected ultrasonic signals may be referred to as a feature-extraction procedure which includes filtering and amplifying the reflected ultrasonic signals for denoising, and applying Fourier Transform (FT) on the reflected ultrasonic signals to estimate the time-frequency distribution of the reflected ultrasonic signals. In which, the Fourier Transform may be Fast Fourier Transform (FFT), partial-time FT, windowed FT, or fractional FT, however the invention is not limited thereto. After that, the portable electronic device determines whether the configuration of the ultrasound transmitter(s) and the ultrasound receiver(s) forms a single reference axis, a single reference plane, or a three-dimensional (3D) coordinate system (step S240).

If the portable electronic device comprises only one ultrasound transmitter and one ultrasound receiver, and the ultrasound transmitter and the ultrasound receiver are disposed to form a single reference axis, then the portable electronic device determines a 1D gesture corresponding to the projection loci of movements of the object on the reference axis according to the time-frequency distribution (step S250).

If the portable electronic device comprises two ultrasound transmitters and one ultrasound receiver, or one ultrasound transmitter and two ultrasound receivers, or one ultrasound transmitter and one directional ultrasound receiver, and the ultrasound transmitter(s) and the ultrasound receiver(s) are disposed to form a single reference plane, then the portable electronic device determines a 2D gesture corresponding to the projection loci of movements of the object on the reference plane according to the time-frequency distribution (step S260).

If the portable electronic device comprises three ultrasound transmitters and one ultrasound receiver, or two ultrasound transmitters and two ultrasound receivers, or one ultrasound transmitter and three ultrasound receivers, or two ultrasound transmitters and one directional ultrasound receiver, or one ultrasound transmitter, one ultrasound receiver, and one directional ultrasound receiver, and the ultrasound transmitter(s) and the ultrasound receiver(s) are disposed to form a 3D coordinate system, then the portable electronic device determines a 3D gesture corresponding to the projection loci of movements of the object on the 3D coordinate system according to the time-frequency distribution (step S270).

After the gesture determinations in steps S250 to S270, the portable electronic device further performs an application control according to the determined gesture (step S280), and the ultrasound-based method ends.

For example, if the determined gesture is a single sweep in one direction (i.e., the projection loci of movements of the object on the reference axis, the reference plane, or the 3D coordinate system comprise a single movement of the object sweeping in one direction), the portable electronic device may perform flipping to the next page or picture of an electronic-book (E-book) or electronic-album (E-album) application, or switching to the next tune or video to be played by a media-player application.

If the determined gesture is a first movement towards the portable electronic device followed by a second movement away from the portable electronic device (i.e., the projection loci of movements of the object on the reference axis, the reference plane, or the 3D coordinate system comprise a movement of the object towards the portable electronic device and a movement of the object away from the portable electronic device), the portable electronic device may perform turning on or off the screen, or returning the UI displayed on the screen to the desktop or main menu, or switching on or off a currently executed application, or playing or pausing a multimedia file, or turning up or down the ring volume, or switching from the ringing mode to the vibration mode, or counting up or down a setting value (e.g., a timer or counter value or a clock setting) of an application.

If the determined gesture is a single swing in a circular motion (i.e., the projection loci of movements of the object on the reference plane or the 3D coordinate system comprise a movement of the object swinging in a circle), the portable electronic device may configure a media-player application to play multimedia files in the shuffle mode, or reorder the playlist of a media-player application, or cancel the selection on the menu of an application, or reset the configuration of an application.

Figure 3A:
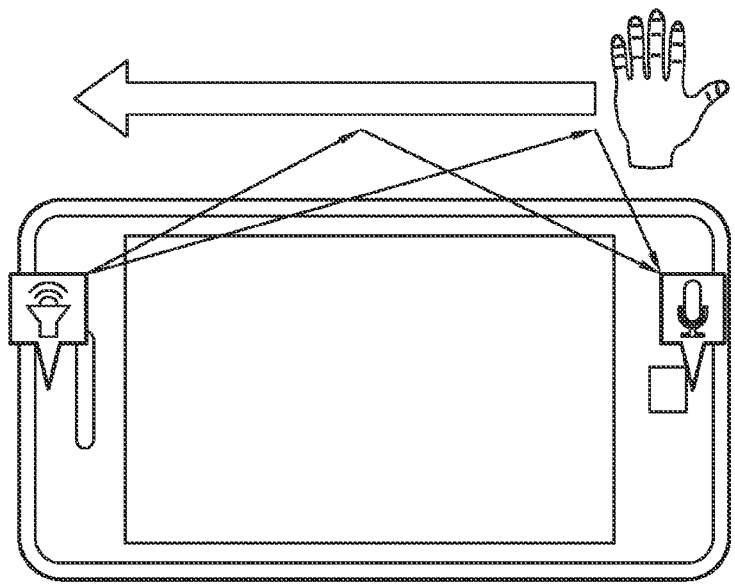
FIGS. 3A and 3B are schematic diagrams illustrating the same configuration of one ultrasound transmitter and one ultrasound receiver with different gestures according to embodiments of the invention.
Figure 3B:
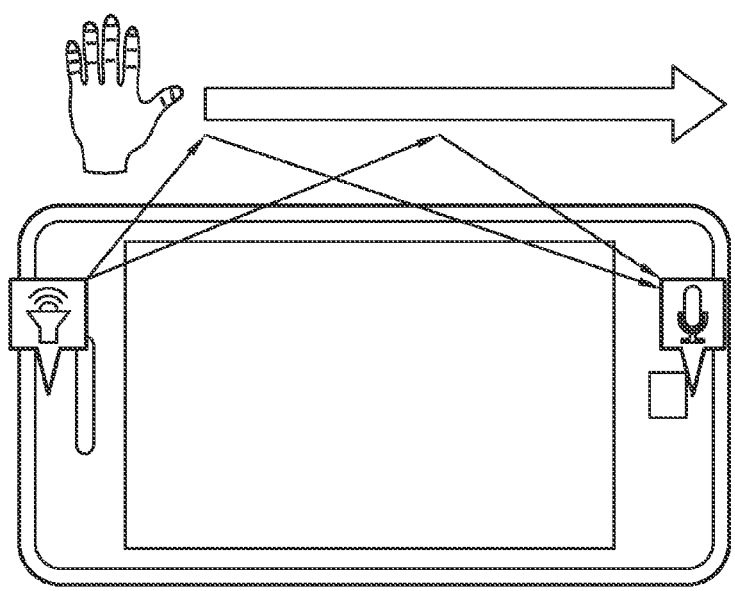

Please note that, due to the Doppler Effect, different gestures will result in different time-frequency distributions of the reflected ultrasonic signals, and therefore, significant features of different gestures may be recognized therefrom. For example, if the portable electronic device comprises one ultrasound transmitter and one ultrasound receiver, and the user's hand is moving towards the ultrasound transmitter, as shown in FIG. 3A, the frequency of a reflected ultrasonic signal may be estimated as follows:

$$f' = \left(\frac{C + V_h}{C}\right) f_0, \quad (1)$$
$$f'' = \left(\frac{C}{C + V_h}\right) f',$$

wherein f' is the frequency of the ultrasonic signal received at the user's hand, $f_0$ is the transmitted frequency of the ultrasonic signal, C is the velocity of waves in the medium, $V_h$ is the velocity of the user's hand relative to the medium, and f" is the frequency of the reflected ultrasonic signal received by the ultrasound receiver. Otherwise, if the user's hand is moving away from the ultrasound transmitter, as shown in FIG. 3B, the frequency of a reflected ultrasonic signal may be estimated as follows:

$$f' = \left(\frac{C - V_h}{C}\right) f_0, \quad (2)$$
$$f'' = \left(\frac{C}{C - V_h}\right) f',$$

wherein the variables in equation (2) are the same as those in equation (1).

Figure 3C:
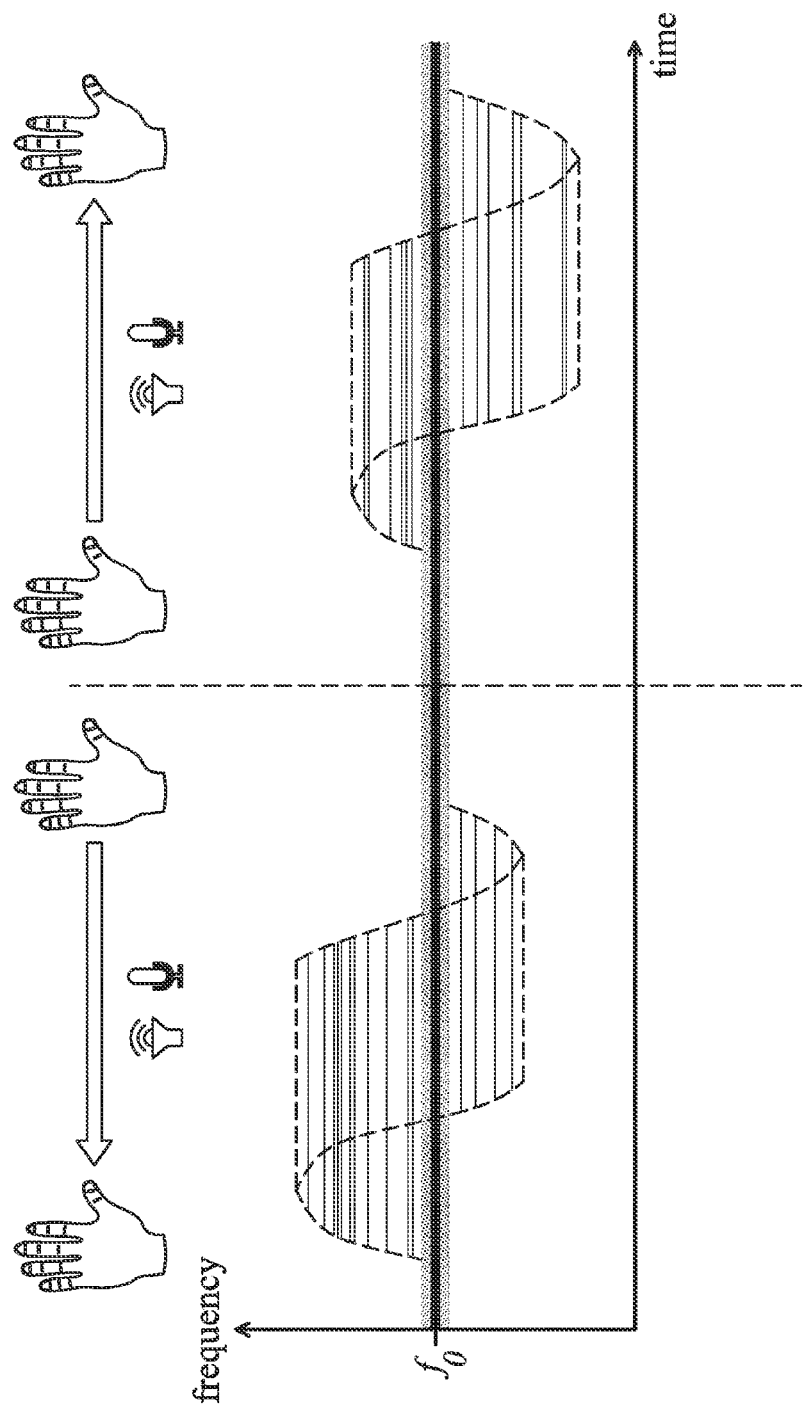
FIG. 3C shows an exemplary time-frequency distribution of the reflected ultrasonic signals corresponding to two gestures passing through a microphone and a speaker in different directions according to an embodiment of the invention.

FIG. 3C shows an exemplary time-frequency distribution of the reflected ultrasonic signals corresponding to two gestures passing through a microphone and a speaker in different directions. As shown in FIG. 3C, for the pattern of frequency variation greater than $f_0$ (i.e., the main tone), the gesture passing through the microphone first and then the speaker causes greater variations at higher frequencies than the gesture passing through the speaker first and then the microphone, due to that the first gesture is closer to the microphone at the early stage of movement and the second gesture is far away from the microphone at the early stage of movement. For the pattern of frequency variation less than the main tone, the second gesture causes greater variations at lower frequencies than the first gesture, due to that the second gesture is closer to the microphone at the later stage of movement and the first gesture is far away from the microphone at the later stage of movement. Thus, the patterns of frequency variation corresponding to the two gestures (denoted by dotted boundaries) are significantly different from each other, and thus, the patterns may be used as the basis for identifying the corresponding gestures. Although $f_0$ is shown to be a single-tone pattern in FIG. 3C, but it is just an illustrative example and the invention cannot be limited thereto. For example, in another embodiment, $f_0$ may be configured to be a multi-tone pattern.

Figure 4A:
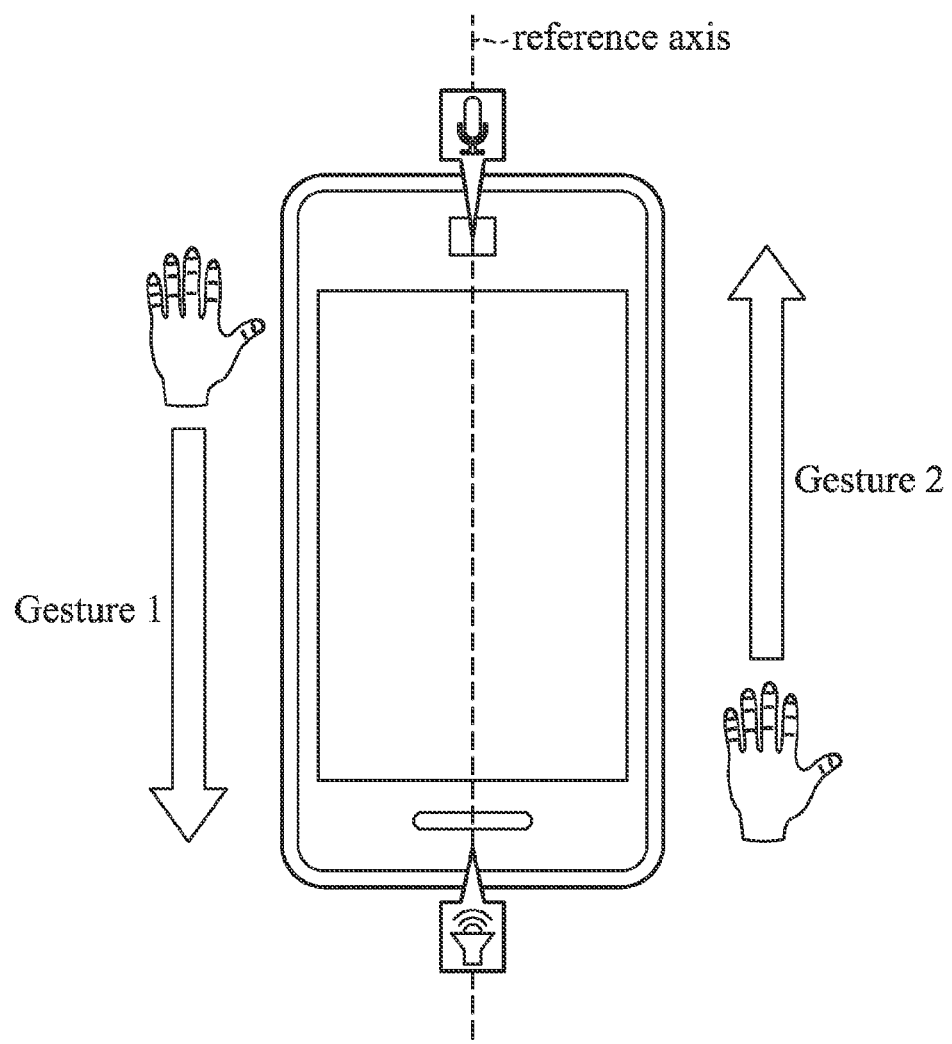
FIGS. 4A to 4C are schematic diagrams illustrating the configurations of one ultrasound transmitter and one ultrasound receiver forming a reference axis with exemplary 1D gestures according to embodiments of the invention.
Figure 4B:
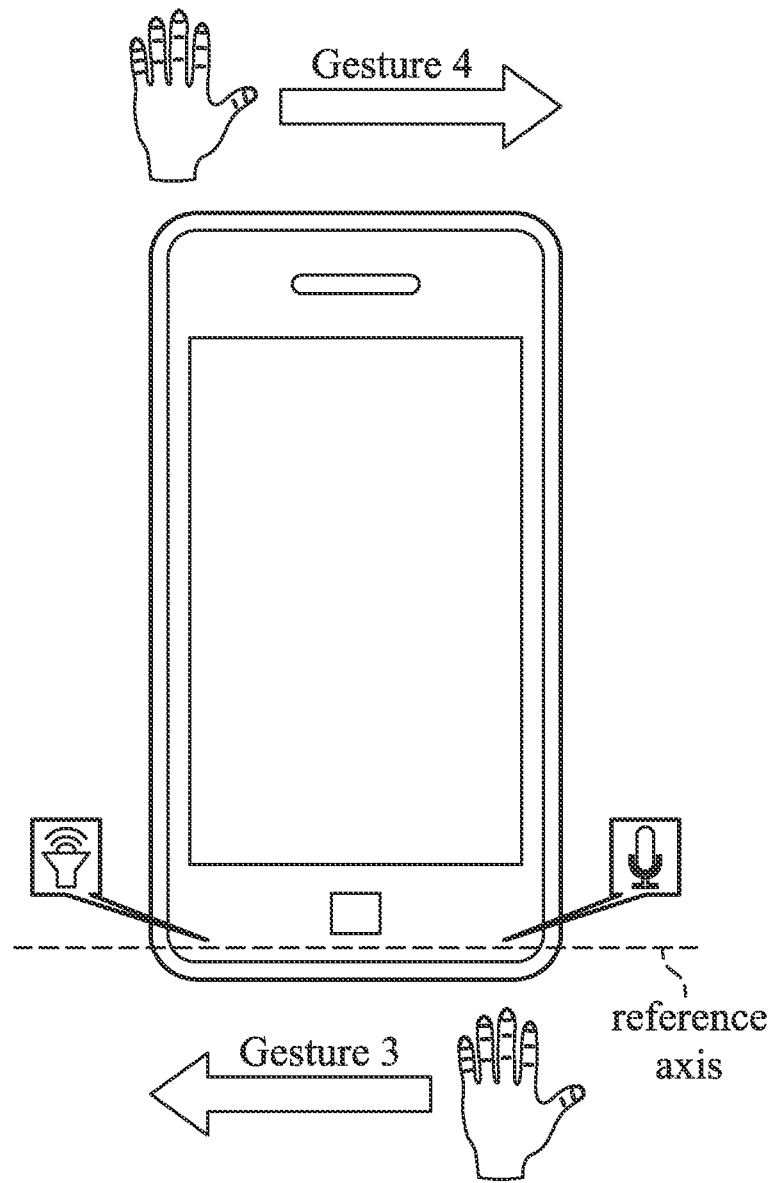
Figure 4C:
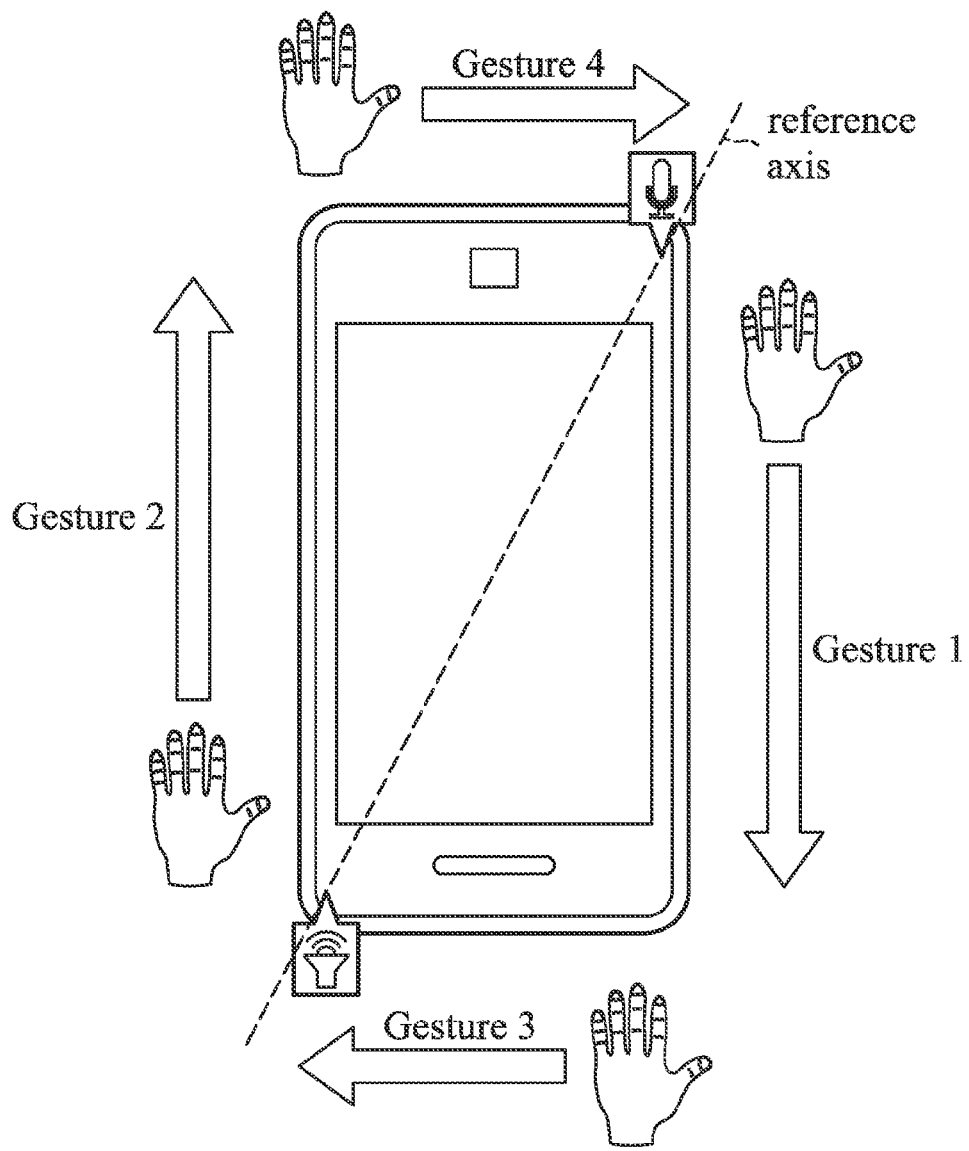

FIGS. 4A to 4C are schematic diagrams illustrating the configurations of one ultrasound transmitter and one ultrasound receiver forming a reference axis with exemplary 1D gestures according to embodiments of the invention.

Figure 5A:
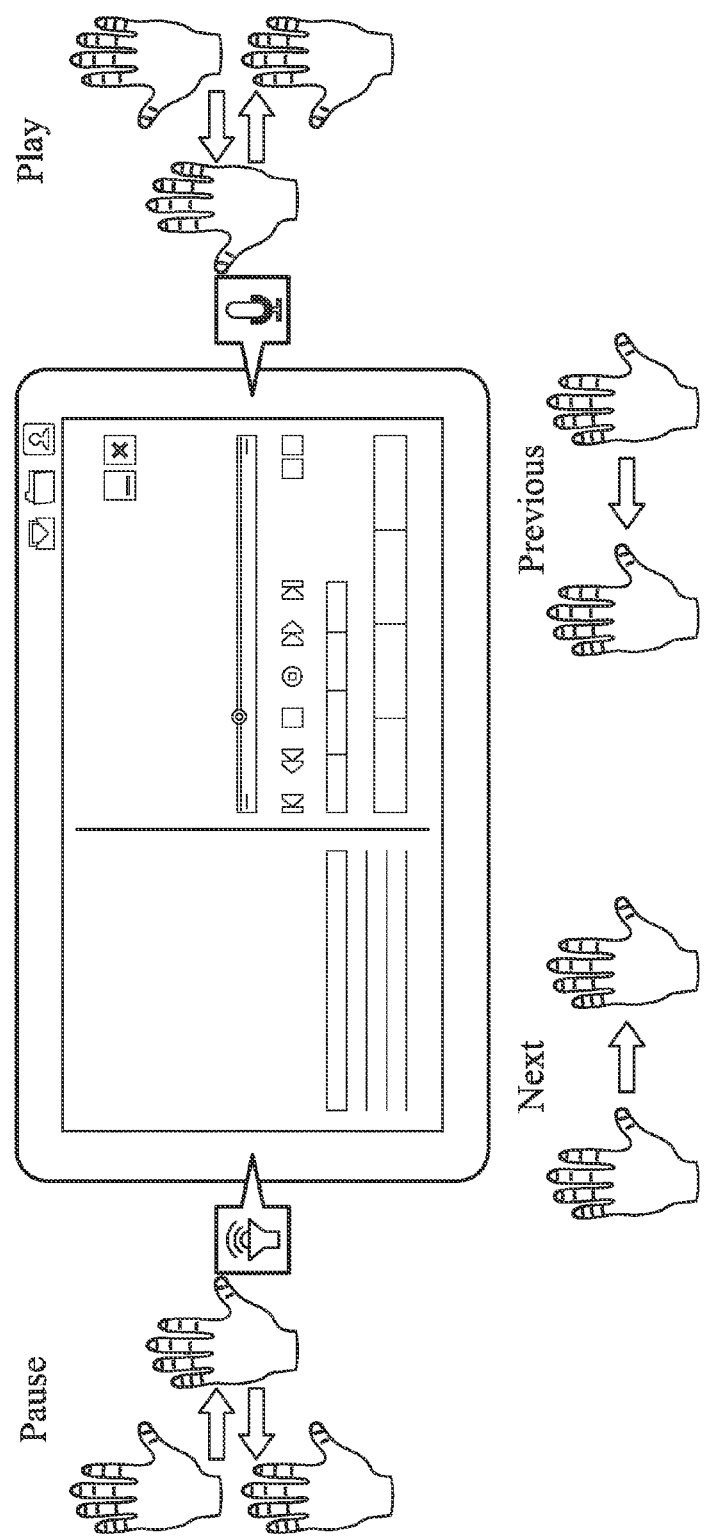
FIG. 5A shows an exemplary diagram of UI controls over a media-player application using Gestures 1 and 2 in FIG. 4A.

As shown in FIG. 4A, one ultrasound transmitter is disposed at the center near the lower end of the front surface of the portable electronic device, while the ultrasound receiver is disposed at the center near the upper end of the front surface of the portable electronic device. The dotted line passing through the ultrasound transmitter and the ultrasound receiver is referred to as the reference axis. Gesture 1 is denoted as the user's hand sweeping downwards along the reference axis (i.e., the projection loci of the movement of the user's hand on the reference axis is in one direction from top to bottom), and Gesture 2 is denoted as the user's hand sweeping upwards along the reference axis (i.e., the projection loci of the movement of the user's hand on the reference axis is in one direction from bottom to top). In other words, Gestures 1 and 2 may be referred to as movements parallel to the long edge of the portable electronic device. Alternatively, the disposed positions of the ultrasound transmitter and the ultrasound receiver may be exchanged in another embodiment. FIG. 5A shows an exemplary diagram of UI controls over a media-player application using Gestures 1 and 2 in FIG. 4A. As shown in FIG. 5A, the combination of Gesture 2 instantly followed by Gesture 1 corresponds to the "Pause" function (i.e., pausing a multimedia file) of the media-player application, a single Gesture 2 corresponds to the "Next" function (i.e., switching to the next tune or video) of the media-player application, a single Gesture 1 corresponds to the "Previous" function (i.e., switching to the previous tune or video) of the media-player application, and the combination of Gesture 1 instantly followed by Gesture 2 corresponds to the "Play" function (i.e., playing a multimedia file) of the media-player application.

Figure 5B:
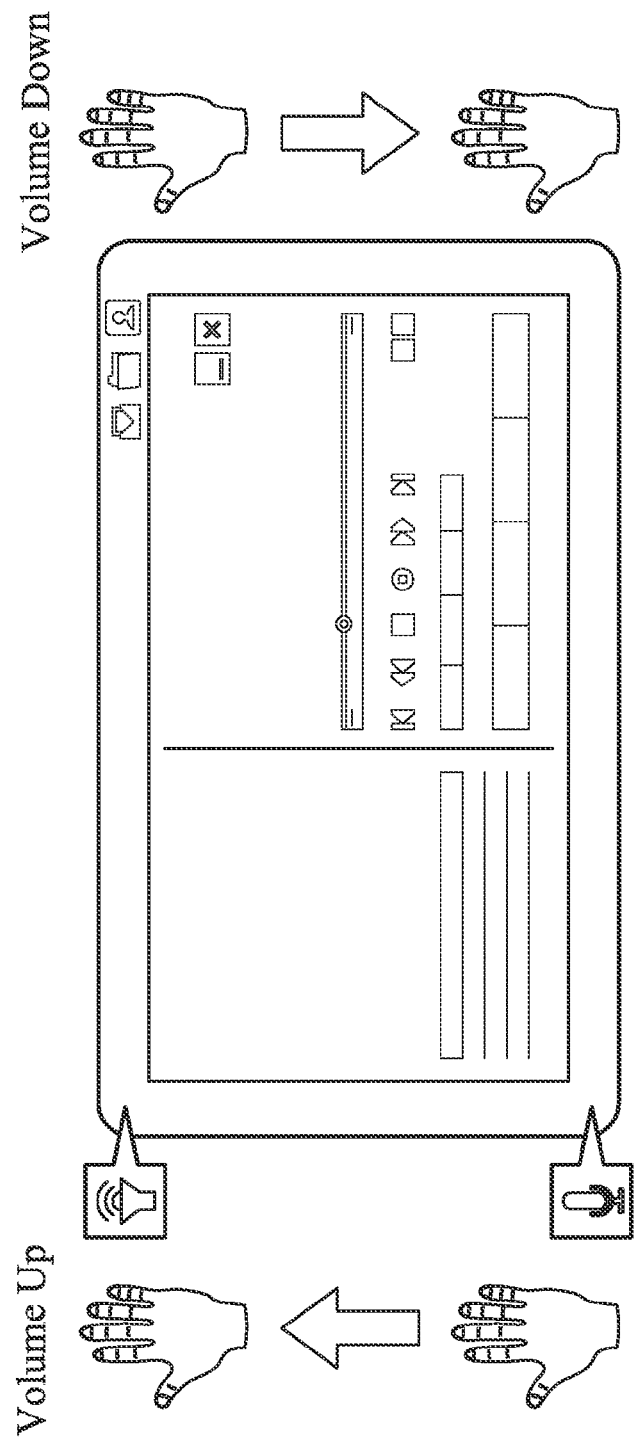
FIG. 5B shows an exemplary diagram of UI controls over a media-player application using Gestures 3 and 4 in FIG. 4B.

As shown in 4B, one ultrasound transmitter is disposed to the left near the lower end of the front surface of the portable electronic device, while the ultrasound receiver is disposed to the right near the lower end of the front surface of the portable electronic device. The dotted line passing through the ultrasound transmitter and the ultrasound receiver is referred to as the reference axis. Gesture 3 is denoted as the user's hand sweeping leftwards along the reference axis (i.e., the projection loci of the movement of the user's hand on the reference axis is in one direction from right to left), and Gesture 4 is denoted as the user's hand sweeping rightwards along the reference axis (i.e., the projection loci of the movement of the user's hand on the reference axis is in one direction from left to right). In other words, Gestures 3 and 4 may be referred to as movements parallel to the short edge of the portable electronic device. Alternatively, the disposed positions of the ultrasound transmitter and the ultrasound receiver may be exchanged in another embodiment. FIG. 5B shows an exemplary diagram of UI controls over a media-player application using Gestures 3 and 4 in FIG. 4B. As shown in FIG. 5B, a single Gesture 3 corresponds to the "Volume Up" function (i.e., turning up the volume) of the media-player application, and a single Gesture 4 corresponds to the "Volume Down" function (i.e., turning down the volume) of the media-player application.

Figure 5C:
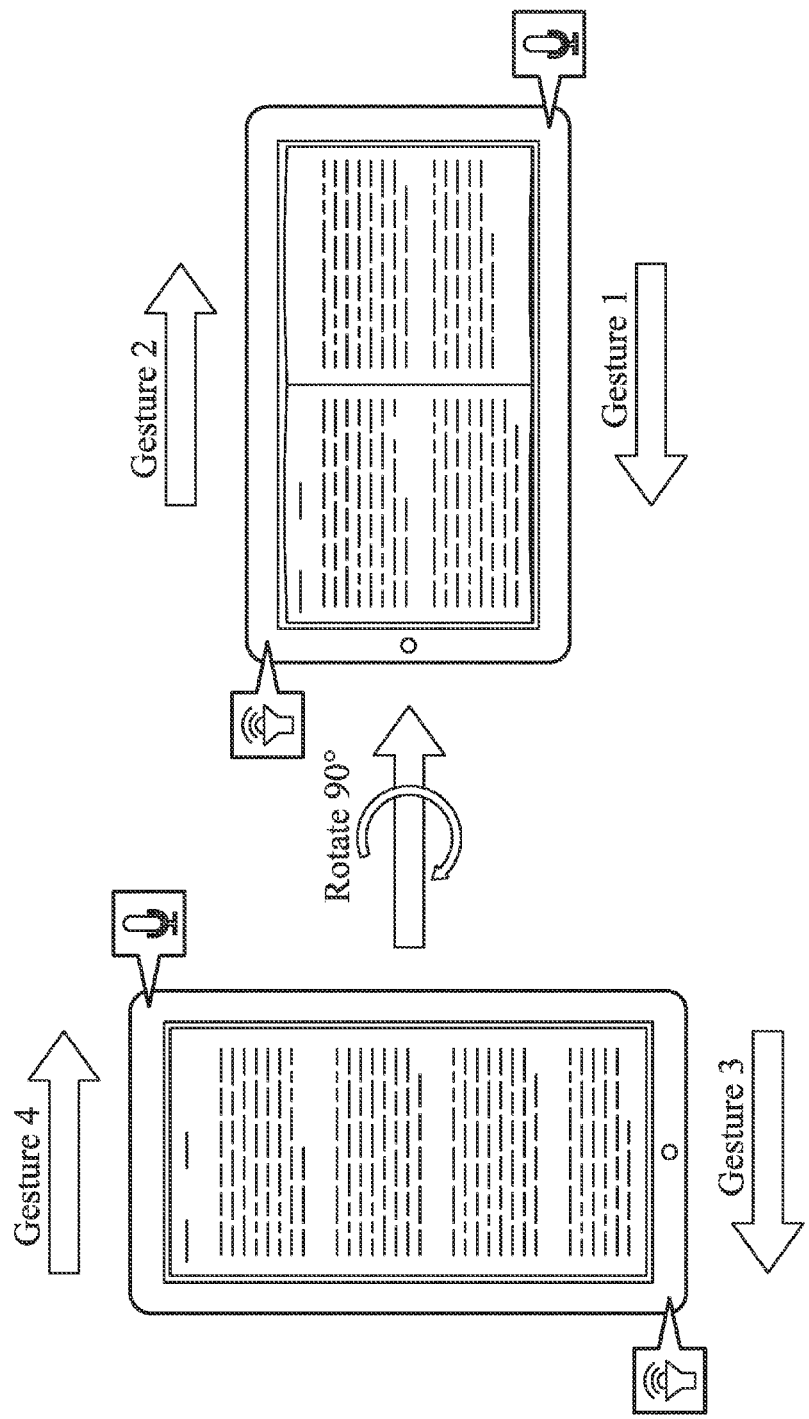
FIG. 5C shows an exemplary diagram of UI controls over an E-book application using Gestures 1 to 4 in FIG. 4C.

As shown in FIG. 4C, one ultrasound transmitter is disposed lengthwise to the left near the lower end of the front surface of the portable electronic device, while the ultrasound receiver is disposed lengthwise to the right near the upper end of the front surface of the portable electronic device. That is, the ultrasound transmitter and the ultrasound receiver are disposed diagonally at the corners of the portable electronic device. The dotted line passing through the ultrasound transmitter and the ultrasound receiver is referred to as the reference axis. Gesture 1 is denoted as the user's hand sweeping downwards with respect to the portable electronic device, and Gesture 3 is denoted as the user's hand sweeping leftwards with respect to the portable electronic device. However, the sweeping downwards and leftwards of the user's hand results in indistinguishable projection loci on the reference axis, i.e., Gestures 1 and 3 will be taken as the same gesture. Gesture 2 is denoted as the user's hand sweeping upwards with respect to the portable electronic device, and Gesture 4 is denoted as the user's hand sweeping rightwards with respect to the portable electronic device. However, the sweeping upwards and rightwards of the user's hand results in indistinguishable projection loci on the reference axis, i.e., Gestures 2 and 4 will be taken as the same gesture. That is, at the same time, Gesture 1 may be distinguishable from Gesture 2, or Gestures 3 may be distinguishable from Gesture 4. Alternatively, the disposed positions of the ultrasound transmitter and the ultrasound receiver may be exchanged in another embodiment. FIG. 5C shows an exemplary diagram of UI controls over an E-book application using Gestures 1 to 4 in FIG. 4C. As shown in FIG. 5C, when the portable electronic device is in an elevated position, a single Gesture 3 corresponds to the "Previous" function (i.e., flipping to the previous page) of the E-book application, and a single Gesture 4 corresponds to the "Next" function (i.e., flipping to the next page) of the E-book application. When the portable electronic device is rotated 90 degrees into a horizontal position, a single Gesture 1 corresponds to the "Previous" function (i.e., flipping to the previous page) of the E-book application, and a single Gesture 2 corresponds to the "Next" function (i.e., flipping to the next page) of the E-book application.

It would be appreciated that the corresponding relationship between the gesture and the function shown in each of the foregoing embodiments is for illustrative purposes only and is not intended to limit the scope of the present application.

Please note that, in the foregoing embodiments, it is assumed that a general portable electronic device comprises at least one microphone and one speaker. By utilizing the existing audio components, the invention advantageously provides UI controls using 1D gestures, without the requirement for any additional audio component, thereby reducing the complexity and/or cost of hardware configuration.

Figure 6A:
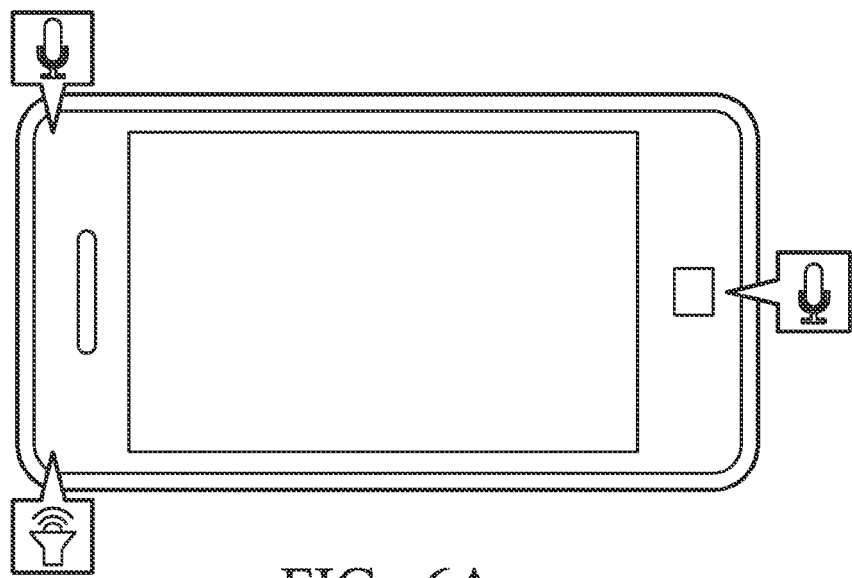
FIG. 6A is a schematic diagram illustrating the configuration of two ultrasound receivers and one ultrasound transmitter in a portable electronic device according to an embodiment of the invention.

FIG. 6A is a schematic diagram illustrating the configuration of two ultrasound receivers and one ultrasound transmitter in a portable electronic device according to an embodiment of the invention. As shown in FIG. 6A, one ultrasound receiver is disposed at the center near the right end of the front surface of the portable electronic device, another ultrasound receiver is disposed at the upper-left corner of the front surface of the portable electronic device, and one ultrasound transmitter is disposed at the lower-left corner of the front surface of the portable electronic device.

Figure 6B:
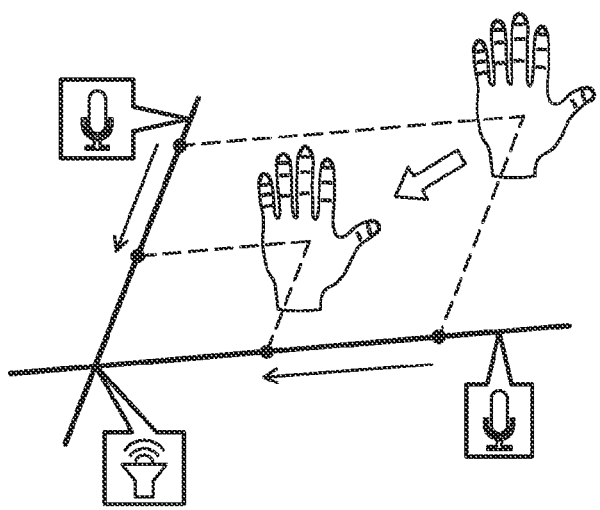
FIG. 6B shows the reference plane formed by two ultrasound receivers and one ultrasound transmitter with an exemplary gesture according to the embodiment of FIG. 6A.

FIG. 6B shows the reference plane formed by two ultrasound receivers and one ultrasound transmitter with an exemplary gesture according to the embodiment of FIG. 6A. As shown in FIG. 6B, the solid line passing through the ultrasound transmitter and one of the ultrasound receivers is referred to as the first reference axis, while the solid line passing through the ultrasound transmitter and the other one of the ultrasound receivers is referred to as the second reference axis. In particular, the two reference axes are non-parallel and no-collinear to each other, and they further form a reference plane, i.e., a two-dimensional (2D) coordinate system, where the movements of the user's hand can be seen as the projection loci on the reference plane. That is, the projection loci on the reference plane may be decomposed into the projection loci on the two reference axes, and thus, by tracking the projection loci on the two reference axes, 2D gestures may be distinctly determined.

Figure 7A:
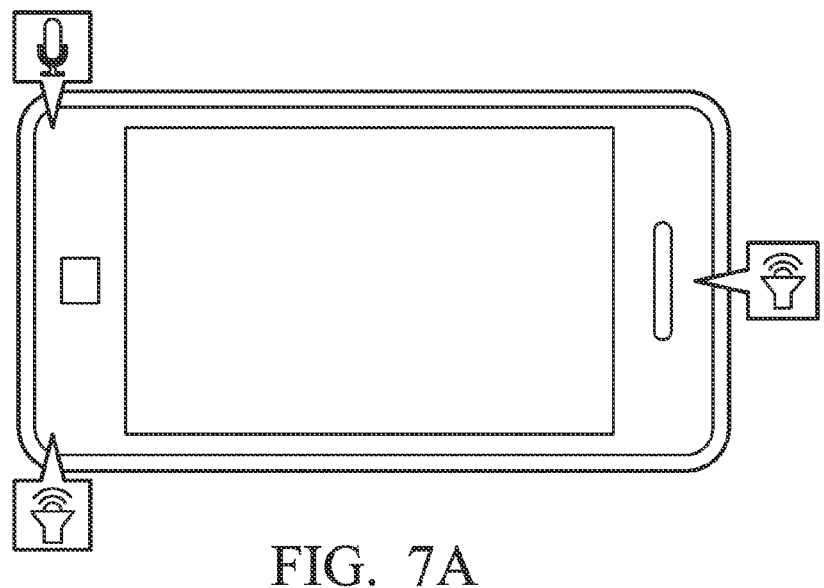
FIG. 7A is a schematic diagram illustrating the configuration of one ultrasound receiver and two ultrasound transmitters in a portable electronic device according to an embodiment of the invention.

FIG. 7A is a schematic diagram illustrating the configuration of one ultrasound receiver and two ultrasound transmitters in a portable electronic device according to an embodiment of the invention. As shown in FIG. 7A, one ultrasound receiver is disposed at the upper-left corner of the front surface of the portable electronic device, one ultrasound transmitter is disposed at the center near the right end of the front surface of the portable electronic device, and another ultrasound transmitter is disposed at the lower-left corner of the front surface of the portable electronic device.

Figure 7B:
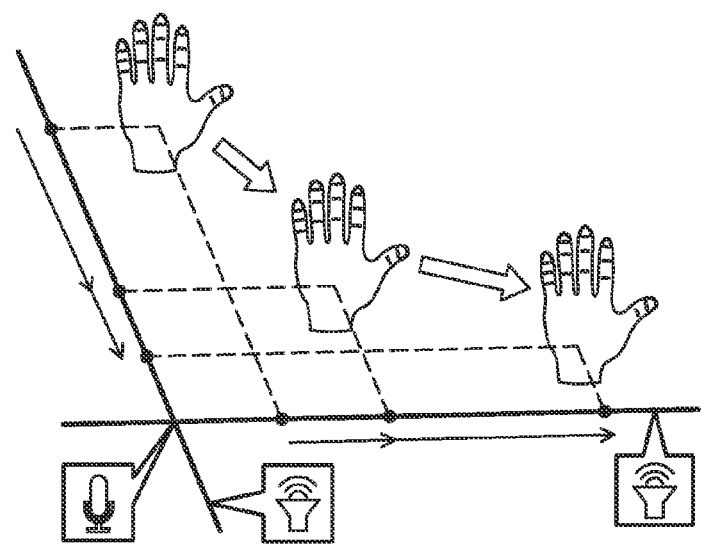
FIG. 7B shows the reference plane formed by one ultrasound receiver and two ultrasound transmitters with an exemplary gesture according to the embodiment of FIG. 7A.

FIG. 7B shows the reference plane formed by one ultrasound receiver and two ultrasound transmitters with an exemplary gesture according to the embodiment of FIG. 7A. As shown in FIG. 7B, the solid line passing through the ultrasound receiver and one of the ultrasound transmitters is referred to as the first reference axis, while the solid line passing through the ultrasound receiver and the other one of the ultrasound transmitters is referred to as the second reference axis. In particularly, the two reference axes are non-parallel and non-collinear to each other, and they further form a reference plane where the movements of the user's hand can be seen as the projection loci on the reference plane, wherein the projection loci on the reference plane may be decomposed into the projection loci on the two reference axes. However, it should be noted that, in this embodiment, the two ultrasound transmitters are configured to send ultrasonic signals at different frequencies or in different frequency patterns, so that the ultrasound receiver may distinguish the reflected ultrasonic signals that are sent by one of the ultrasound transmitters from those sent by the other ultrasound transmitter. For example, one of the ultrasound transmitters may be configured to send ultrasonic signals at the frequency of 40 KHz, while the other ultrasound transmitter may be configured to send ultrasonic signals at the frequency of 42 KHz. Alternatively, one of the ultrasound transmitters may be configured to send ultrasonic signals at the frequency sweeping from 40 KHz to 41 KHz (i.e., a special frequency pattern), while the other ultrasound transmitter may be configured to send ultrasonic signals at the frequency sweeping from 42 KHz to 43 KHz.

Figure 8A:
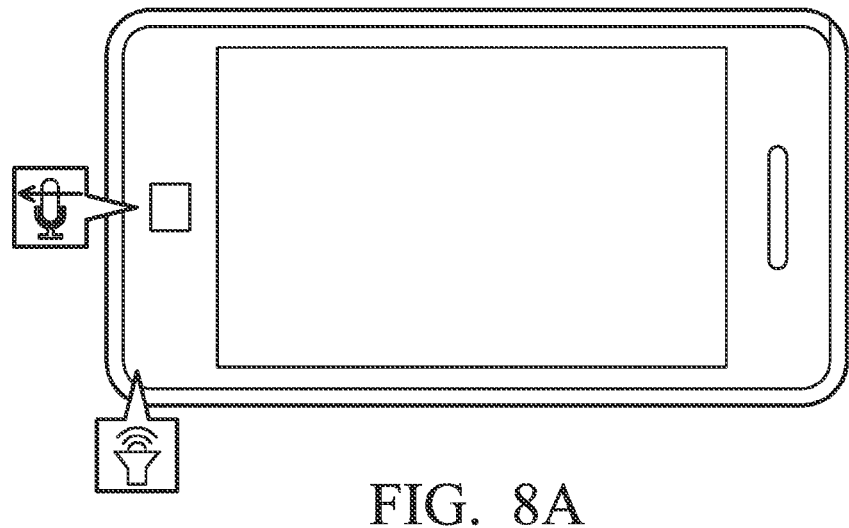
FIG. 8A is a schematic diagram illustrating the configuration of one directional ultrasound receiver and one ultrasound transmitter in a portable electronic device according to an embodiment of the invention.

FIG. 8A is a schematic diagram illustrating the configuration of one directional ultrasound receiver and one ultrasound transmitter in a portable electronic device according to an embodiment of the invention. As shown in FIG. 8A, one directional ultrasound receiver is disposed at the center near the left end of the front surface of the portable electronic device, and one ultrasound transmitter is disposed at the lower-left corner of the front surface of the portable electronic device. The directional ultrasound receiver can bias the strength of the reflected ultrasonic signals received from one specific side of the directional ultrasound receiver. That is, the reflected ultrasonic signals received from the favoring direction (i.e., left in this embodiment) have stronger signal strength than those received from the other direction. Thus, by observing changes in the signal strength of the reflected ultrasonic signals, the direction of motion of a gesture may be distinctly determined. For example, in cases where the favoring direction is left, the signal strength of the reflected ultrasonic signals changes from weak to strong for a gesture sweeping from right to left, and the signal strength of the reflected ultrasonic signals changes from strong to weak for a gesture sweeping from left to right.

Figure 8B:
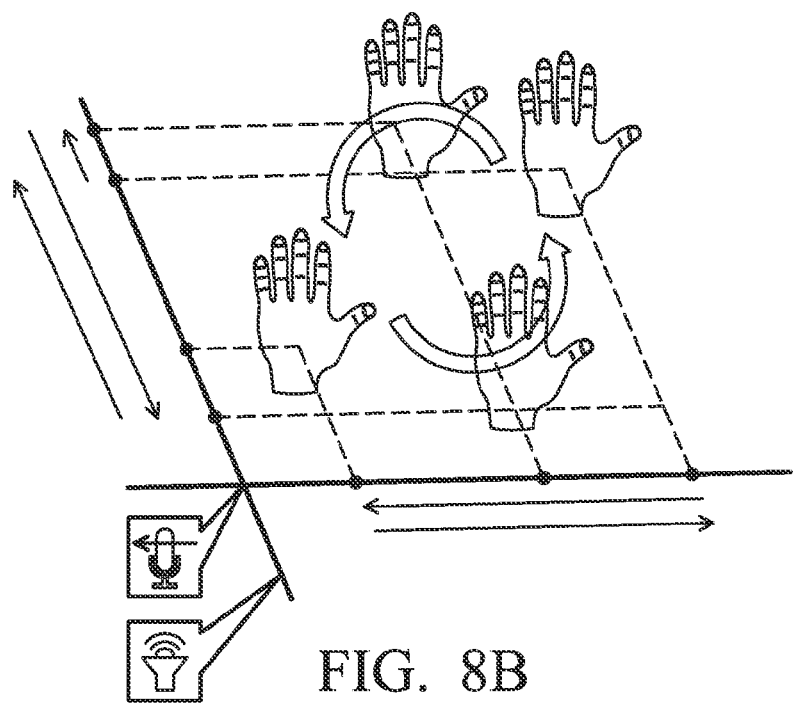
FIG. 8B shows the reference plane formed by one directional ultrasound receiver and one ultrasound transmitter according to the embodiment of FIG. 8A.

FIG. 8B shows the reference plane formed by one directional ultrasound receiver and one ultrasound transmitter according to the embodiment of FIG. 8A. As shown in FIG. 8B, the solid line passing through the directional ultrasound receiver and the ultrasound transmitter is referred to as the first reference axis, while the solid line passing through the ultrasound transmitter in its favoring direction is referred to as the second reference axis. In particular, the two reference axes are non-parallel and non-collinear to each other, and they further form a reference plane where the movements of the user's hand can be seen as the projection loci on the reference plane, wherein the projection loci on the reference plane may be decomposed into the projection loci on the two reference axes.

Figure 9:
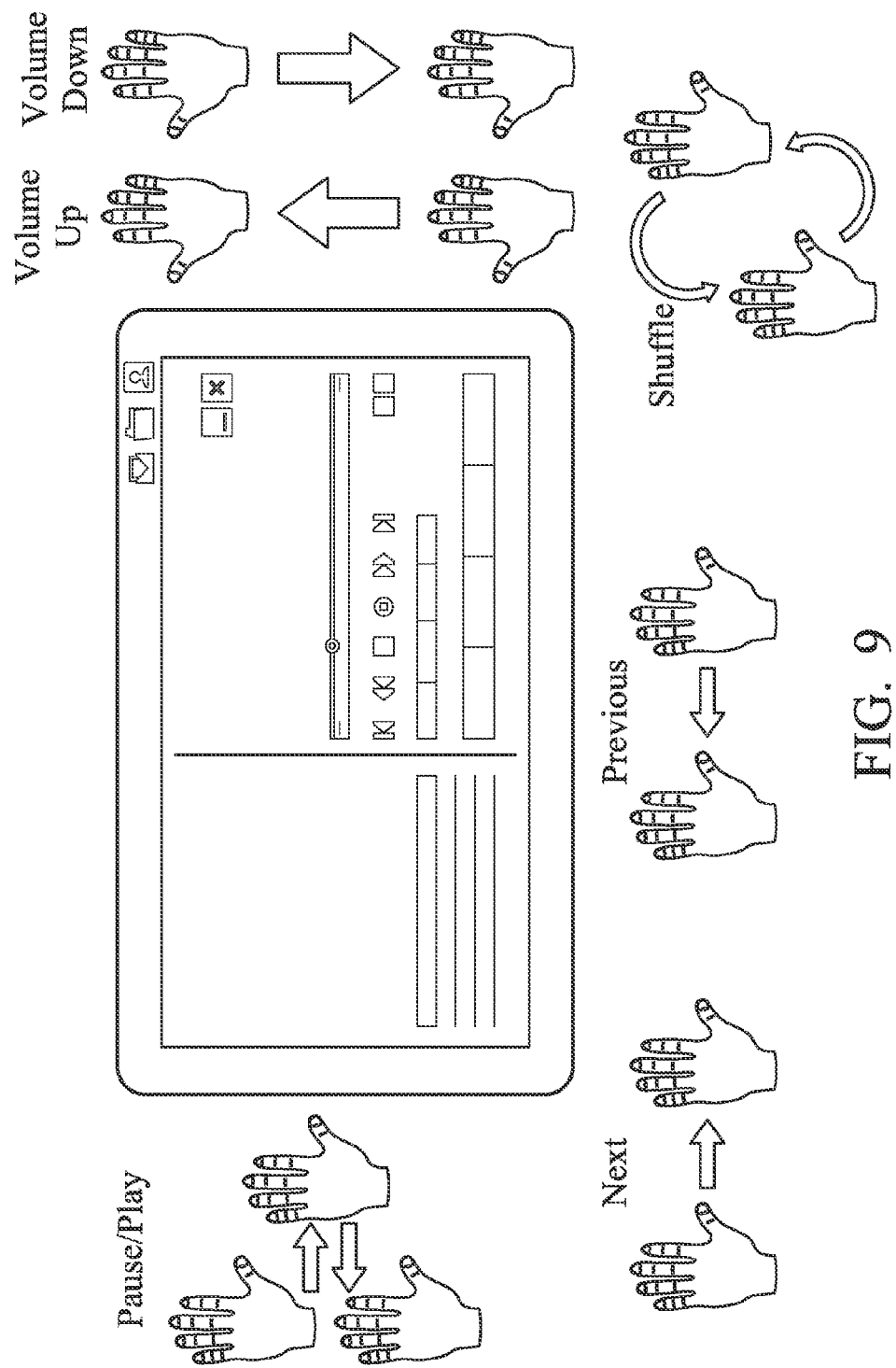
FIG. 9 shows an exemplary diagram of UI controls over a media-player application using 2D gestures according to the embodiments of FIGS. 6A, 7A, and 8A.

FIG. 9 shows an exemplary diagram of UI controls over a media-player application using 2D gestures according to the embodiments of FIGS. 6A, 7A, and 8A. Since the embodiment of FIGS. 6A, 7A, and 8A covers different configurations of ultrasound transmitter(s) and ultrasound receiver(s), the exact positions of their disposals are omitted in FIG. 9. As shown in FIG. 9, a gesture sweeping from left to right in combination of a gesture sweeping from right to left corresponds to the "Pause/Play" function (i.e., pausing or playing a multimedia file) of the media-player application, a single gesture sweeping from left to right corresponds to the "Next" function (i.e., switching to the next tune or video) of the media-player application, a single gesture sweeping from right to left corresponds to the "Previous" function (i.e., switching to the previous tune or video) of the media-player application, a single gesture sweeping from bottom to top corresponds to the "Volume Up" function (i.e., turning up the volume) of the media-player application, a single gesture sweeping from top to bottom corresponds to the "Volume Down" function (i.e., turning down the volume) of the media-player application, and a single gesture drawing a circle counterclockwise corresponds to the "Shuffle" function (i.e., randomly playing one of a plurality of multimedia files) of the media-player application. However, the corresponding relationship between the gesture and the function shown in the foregoing embodiment is for illustrative purposes only and is not intended to limit the scope of the present application.

Figure 10A:
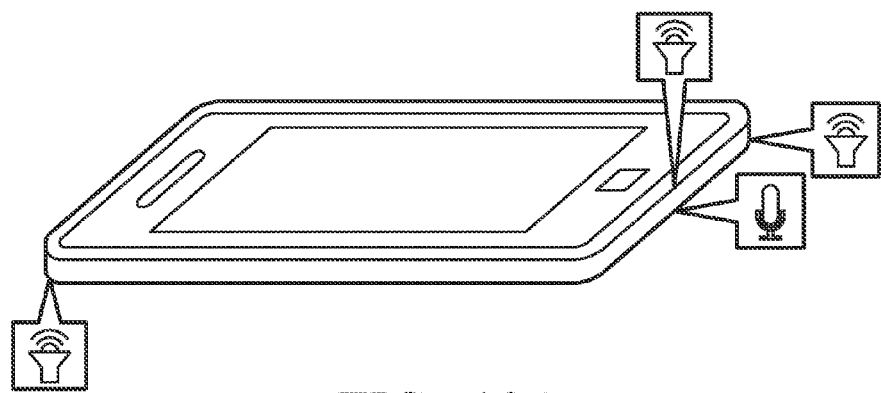
FIG. 10A is a schematic diagram illustrating the configuration of three ultrasound transmitters and one ultrasound receiver in a portable electronic device according to an embodiment of the invention.

FIG. 10A is a schematic diagram illustrating the configuration of three ultrasound transmitters and one ultrasound receiver in a portable electronic device according to an embodiment of the invention. As shown in FIG. 10A, one ultrasound transmitter is disposed at the center near the right end of the front surface of the portable electronic device, another ultrasound transmitter is disposed at the upper-right corner of the back surface of the portable electronic device, yet another ultrasound transmitter is disposed at the lower-left corner of the back surface of the portable electronic device, and one ultrasound receiver is disposed at the center near the right end of the back surface of the portable electronic device. In particular, the three ultrasound transmitters are configured to send ultrasonic signals at different frequencies or in different frequency patterns, so that the ultrasound receiver may distinguish the reflected ultrasonic signals that are sent by one of the ultrasound transmitters from those sent by the other two ultrasound transmitters.

Figure 10B:
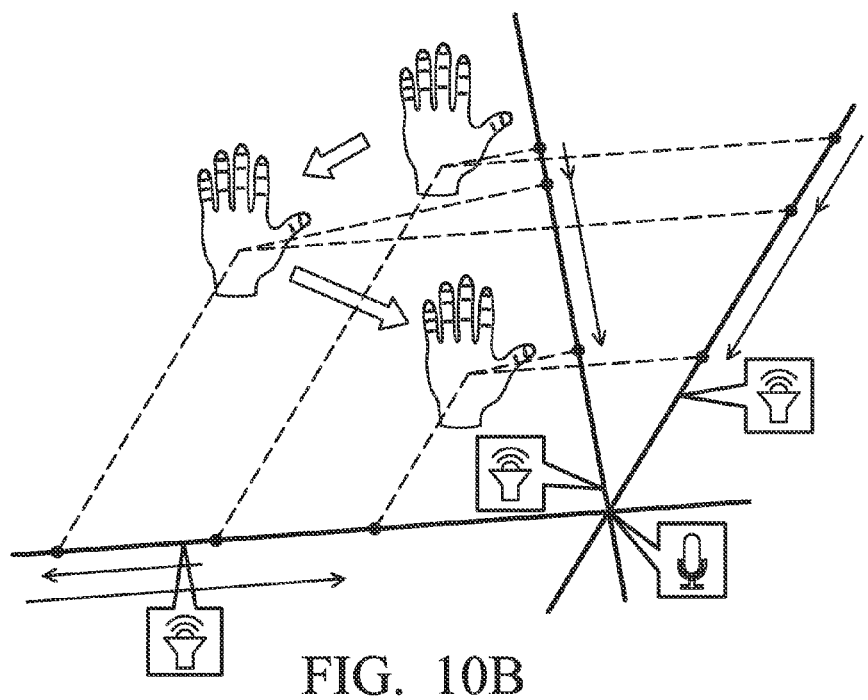
FIG. 10B shows the 3D coordinate system formed by three ultrasound transmitters and one ultrasound receiver with an exemplary gesture according to the embodiment of FIG. 10A.

FIG. 10B shows the 3D coordinate system formed by three ultrasound transmitters and one ultrasound receiver with an exemplary gesture according to the embodiment of FIG. 10A. As shown in FIG. 10B, the solid lines passing through the ultrasound receiver and each of the ultrasound transmitters are referred to as three separate reference axes, wherein the position of the ultrasound receiver is the cross point of the three reference axes. In particular, the three reference axes are non-coplanar and they further form a 3D coordinate system, where the movements of the user's hand can be seen as the projection loci on the 3D coordinate system. In addition, the projection loci on the 3D coordinate system may be decomposed into the projection loci on the three reference axes, and thus, by tracking the projection loci on the three reference axes, 3D gestures may be distinctly determined.

Figure 11:
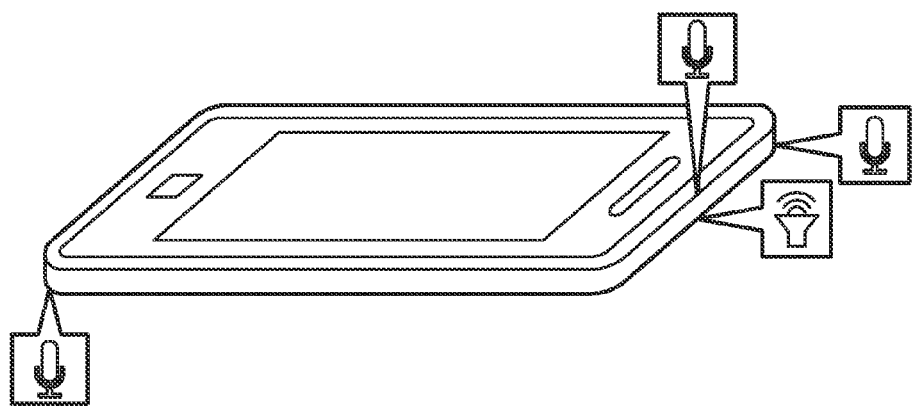
FIG. 11 is a schematic diagram illustrating the configuration of three ultrasound receivers and one ultrasound transmitter in a portable electronic device according to an embodiment of the invention.

FIG. 11 is a schematic diagram illustrating the configuration of three ultrasound receivers and one ultrasound transmitter in a portable electronic device according to an embodiment of the invention. As shown in FIG. 11, one ultrasound receiver is disposed at the center near the right end of the front surface of the portable electronic device, another ultrasound receiver is disposed at the upper-right corner of the back surface of the portable electronic device, yet another ultrasound receiver is disposed at the lower-left corner of the back surface of the portable electronic device, and one ultrasound transmitter is disposed at the center near the right end of the back surface of the portable electronic device. The ultrasound transmitter and each of the ultrasound receivers form a respective reference axis, and the three reference axes are non-coplanar to further form a 3D coordinate system similar to FIG. 10B.

Figure 12:
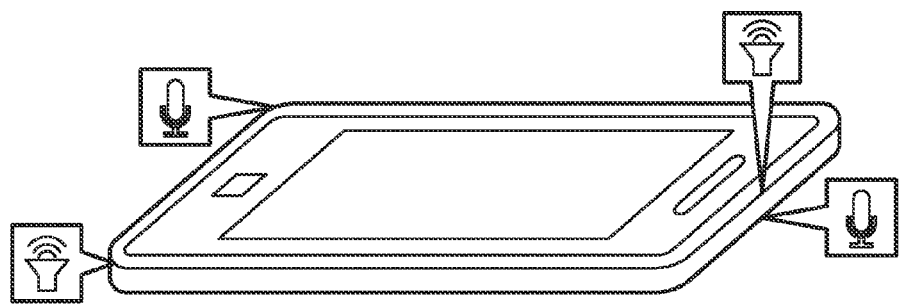
FIG. 12 is a schematic diagram illustrating the configuration of two ultrasound transmitters and two ultrasound receivers in a portable electronic device according to an embodiment of the invention.

FIG. 12 is a schematic diagram illustrating the configuration of two ultrasound transmitters and two ultrasound receivers in a portable electronic device according to an embodiment of the invention. As shown in FIG. 12, one ultrasound transmitter is disposed at the center near the right end of the front surface of the portable electronic device, another ultrasound transmitter is disposed at the lower-left corner of the front surface of the portable electronic device, one ultrasound receiver is disposed at the center near the right end of the back surface of the portable electronic device, and another ultrasound receiver is disposed at the upper-left corner of the front surface of the portable electronic device. One of the ultrasound transmitters and each of the ultrasound receivers form a respective reference axis, and the other one of the ultrasound transmitters and each of the ultrasound receivers form a respective reference axis. Thus, there are four non-coplanar reference axes in total, and any three of them may be selected to form a 3D coordinate system similar to FIG. 10B. In addition, the two ultrasound transmitters are configured to send ultrasonic signals at different frequencies or in different frequency patterns, so that each ultrasound receiver may distinguish the reflected ultrasonic signals that are sent by one of the ultrasound transmitters from those sent by the other ultrasound transmitter.

Figure 13:
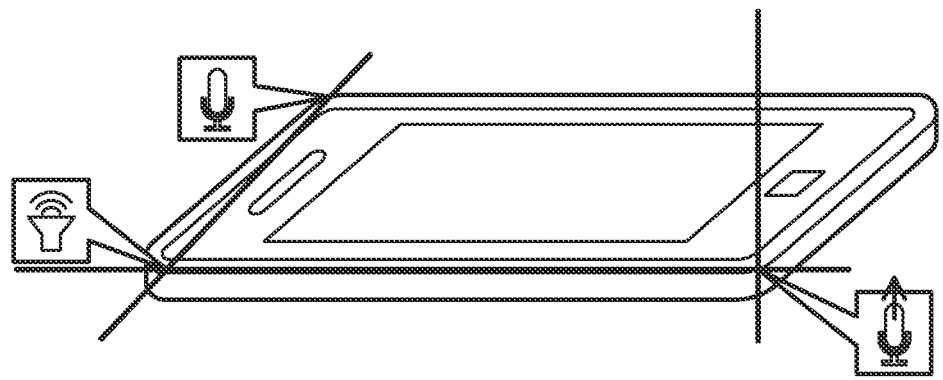
FIG. 13 is a schematic diagram illustrating the configuration of one directional ultrasound receiver, one ultrasound receiver, and one ultrasound transmitter in a portable electronic device according to an embodiment of the invention.

FIG. 13 is a schematic diagram illustrating the configuration of one directional ultrasound receiver, one ultrasound receiver, and one ultrasound transmitter in a portable electronic device according to an embodiment of the invention. As shown in FIG. 13, one directional ultrasound receiver is disposed at lower-right corner of the front surface of the portable electronic device, one normal (i.e., non-directional) ultrasound receiver is disposed at the upper-left corner of the front surface of the portable electronic device, and one ultrasound transmitter is disposed at the lower-left corner of the front surface of the portable electronic device. The ultrasound transmitter and each of the ultrasound receivers form a respective reference axis, and the directional ultrasound receiver provides an additional reference axis along its favoring direction. In particular, the three reference axes are non-coplanar and they further form a 3D coordinate system similar to FIG. 10B.

Figure 14:
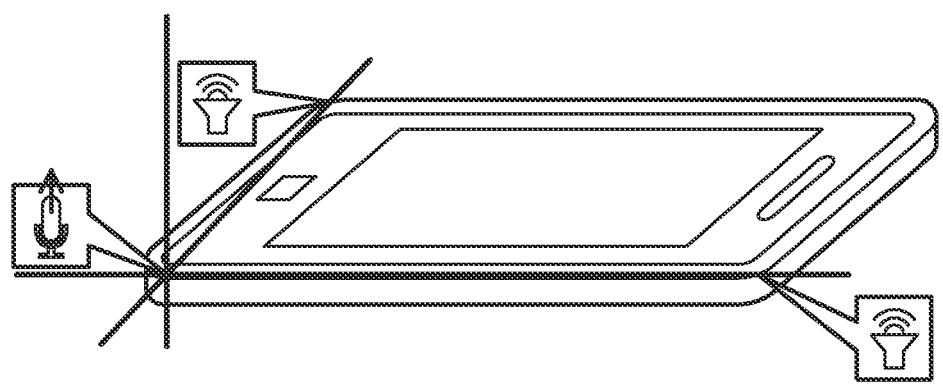
FIG. 14 is a schematic diagram illustrating the configuration of one directional ultrasound receiver and two ultrasound transmitters in a portable electronic device according to an embodiment of the invention.

FIG. 14 is a schematic diagram illustrating the configuration of one directional ultrasound receiver and two ultrasound transmitters in a portable electronic device according to an embodiment of the invention. As shown in FIG. 14, one directional ultrasound receiver is disposed at lower-left corner of the front surface of the portable electronic device, one ultrasound transmitter is disposed at the upper-left corner of the front surface of the portable electronic device, and another ultrasound transmitter is disposed at the lower-right corner of the front surface of the portable electronic device. The directional ultrasound receiver and each of the ultrasound transmitters form a respective reference axis, and the directional ultrasound receiver provides an additional reference axis along its favoring direction. In particular, the three reference axes are non-coplanar and they further form a 3D coordinate system similar to FIG. 10B. Particularly, the two ultrasound transmitters are configured to send ultrasonic signals at different frequencies or in different frequency patterns, so that the directional ultrasound receiver may distinguish the reflected ultrasonic signals that are sent by one of the ultrasound transmitters from those sent by the other ultrasound transmitter.

Please note that, by utilizing a directional ultrasound receiver, the number of ultrasound components, such as ultrasound transmitter(s) and ultrasound receiver(s), required for constructing a 2D or 3D coordinate system may be reduced, thereby reducing the complexity and/or cost of hardware configuration.

Figure 15:
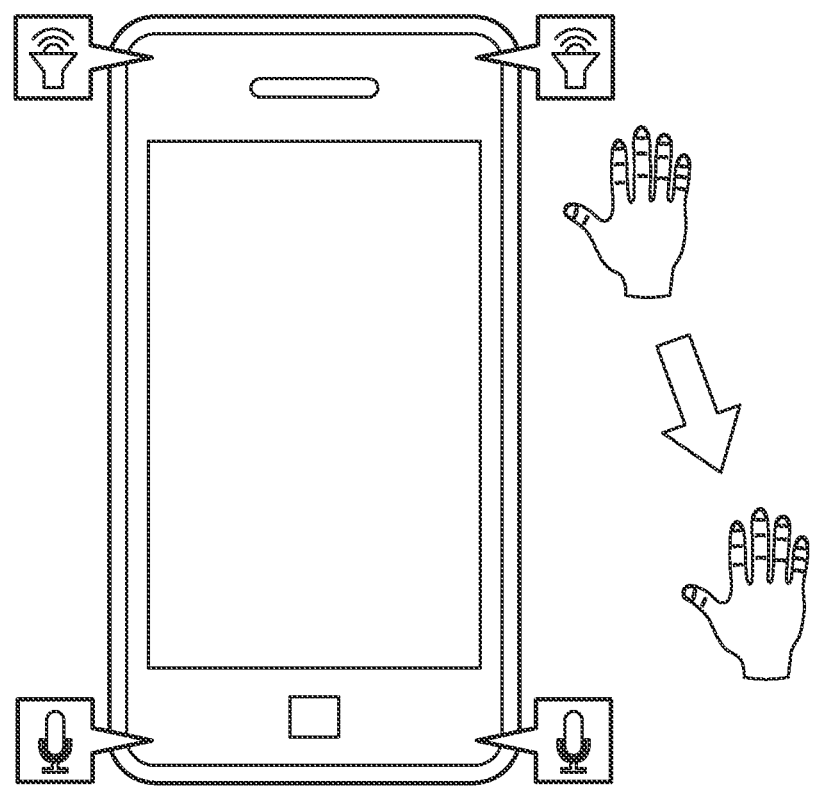
FIG. 15 is a schematic diagram illustrating the configuration of two ultrasound receivers and two ultrasound transmitters in a portable electronic device with an exemplary gesture on the side according to an embodiment of the invention.

There are cases where 1D gesture is enough for UI controls but higher resolution of the 1D gesture recognition is required. In such cases, more than two ultrasound components may be introduced for enhancing the resolution of gesture recognition, instead of providing information for more dimensions. FIG. 15 is a schematic diagram illustrating the configuration of two ultrasound receivers and two ultrasound transmitters in a portable electronic device with an exemplary gesture on the side according to an embodiment of the invention. As shown in FIG. 15, an ultrasound transmitter and receiver pair is disposed at the left end of the front surface of the portable electronic device, while another ultrasound transmitter and receiver pair is disposed at the right end of the front surface of the portable electronic device, wherein the two pairs of ultrasound transmitters and receivers are parallel to each other. Although the second ultrasound transmitter and receiver pair cannot provide information for more dimensions, it can enhance the gesture recognition regarding which side of the portable electronic device the gesture is being performed at. In this embodiment, since the gesture is taking place at the right side of the portable electronic device, the ultrasound receiver disposed at the right end of the portable electronic device receives stronger ultrasonic signals reflected from the user's hand than the ultrasound receiver disposed at the left end of the portable electronic device.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

Note that use of ordinal terms such as "first", "second", "third", etc., in the claims to modify a claim element does not by itself connote any priority, precedence, or order of one claim element over another or the temporal order in which acts of the method are performed, but are used merely as labels to distinguish one claim element having a certain name from another element having the same name (except for use of ordinal terms), to distinguish the claim elements.

What is claimed is:

1. A portable electronic device, comprising:
   a first ultrasound transmitter, sending ultrasonic signals;
   a first ultrasound receiver, receiving reflected ultrasonic signals from an object, wherein the first ultrasound transmitter and the first ultrasound receiver are disposed to form a reference axis, and the first ultrasound receiver is a directional microphone which provides another reference axis non-parallel to the reference axis, and the two reference axes further form a reference plane; and
   a processing circuit, processing the reflected ultrasonic signals to obtain a time-frequency distribution thereof, determining a 1D gesture corresponding to projection loci of movements of the object on the reference axis according to the time-frequency distribution, and determining a 2D gesture corresponding to projection loci of movements of the object on the reference plane according to the time-frequency distribution.

2. The portable electronic device of claim 1, further comprising:
   a second ultrasound transmitter for sending the ultrasonic signals, wherein the ultrasonic signals are sent at different frequencies or in different frequency patterns by the first ultrasound transmitter and the second ultrasound transmitter; and
   a second ultrasound receiver for receiving the reflected ultrasonic signals, wherein the second ultrasound transmitter and the second ultrasound receiver are disposed to form another reference axis parallel to the reference axis, and
   wherein the processing circuit further determines which one of the two reference axes to which the 1D gesture is closer according to the reflected ultrasonic signals received by the first ultrasound receiver and the second ultrasound receiver.

3. The portable electronic device of claim 1, wherein the projection loci of movements of the object on the reference axis comprise a single movement of the object sweeping in one direction.

4. The portable electronic device of claim 3, wherein the processing circuit further performs one of the following:
   flipping to a next page or picture displayed by an electronic-book (E-book) or electronic-album (E-album) application executed on the portable electronic device; and
   switching to a next or previous tune or video to be played by a media-player application executed on the portable electronic device.

5. The portable electronic device of claim 1, wherein the projection loci of movements of the object on the reference axis comprise a movement of the object towards the portable electronic device and a movement of the object away from the portable electronic device.

6. The portable electronic device of claim 5, wherein the processing circuit further performs one of the following:
   turning on or off a screen of the portable electronic device;
   returning a User Interface (UI) displayed on the screen to a desktop or a main menu;
   switching on or off an application currently executed on the portable electronic device;
   playing or pausing a multimedia file on the portable electronic device;
   turning up or down a ring volume of the portable electronic device, or switching the portable electronic device from a ringing mode to a vibration mode; and
   counting up or down a setting value of the application currently executed on the portable electronic device.

7. The portable electronic device of claim 1, wherein the projection loci of movements of the object on the reference plane comprise a movement of the object swinging in a circle.

8. The portable electronic device of claim 7, wherein the processing circuit further performs one of the following:
   configuring a media-player application executed on the portable electronic device to play multimedia files in a shuffle mode;
   reordering a playlist of the media-player application executed on the portable electronic device;
   canceling a selection on a menu of an application executed on the portable electronic device; and
   resetting a configuration of the application executed on the portable electronic device.

9. An ultrasound-based method for touchless gesture recognition by a portable electronic device, comprising:
   sending ultrasonic signals via a first ultrasound transmitter;
   receiving reflected ultrasonic signals from an object via a first ultrasound receiver, wherein the first ultrasound transmitter and the first ultrasound receiver are disposed to form a reference axis, the first ultrasound receiver is a directional microphone which provides another reference axis non-parallel to the reference axis, and the two reference axes further form a reference plane;
   processing the reflected ultrasonic signals to obtain a time-frequency distribution thereof;
   determining a 1D gesture corresponding to projection loci of movements of the object on the reference axis according to the time-frequency distribution; and
   determining a 2D gesture corresponding to projection loci of movements of the object on the reference plane according to the time-frequency distribution.

10. The ultrasound-based method of claim 9, further comprising:
    sending the ultrasonic signals via a second ultrasound transmitter, wherein the ultrasonic signals are sent at different frequencies or in different frequency patterns by the first ultrasound transmitter and the second ultrasound transmitter;

receiving the reflected ultrasonic signals via a second ultrasound receiver, wherein the second ultrasound transmitter and the second ultrasound receiver are disposed to form another reference axis parallel to the reference axis; and determining which one of the two reference axes to which the 1D gesture is closer according to the reflected ultrasonic signals received by the first ultrasound receiver and the second ultrasound receiver.

11. The ultrasound-based method of claim 9, wherein the projection loci of movements of the object on the reference axis comprise a single movement of the object sweeping in one direction.

12. The ultrasound-based method of claim 11, further comprising:
flipping to a next page or picture displayed by an electronic-book (E-book) or electronic-album (E-album) application executed on the portable electronic device; and
switching to a next or previous tune or video to be played by a media-player application executed on the portable electronic device.

13. The ultrasound-based method of claim 9, wherein the projection loci of movements of the object on the reference axis comprise a movement of the object towards the portable electronic device and a movement of the object away from the portable electronic device.

14. The ultrasound-based method of claim 13, further comprising:
turning on or off a screen of the portable electronic device;
returning a User Interface (UI) displayed on the screen to a desktop or a main menu;
switching on or off an application currently executed on the portable electronic device;
playing or pausing a multimedia file on the portable electronic device;
turning up or down a ring volume of the portable electronic device, or switching the portable electronic device from a ringing mode to a vibration mode; and
counting up or down a setting value of the application currently executed on the portable electronic device.

15. The ultrasound-based method of claim 9, wherein the projection loci of movements of the object on the reference plane comprise a movement of the object swinging in a circle.

16. The ultrasound-based method of claim 15, further comprising:
configuring a media-player application executed on the portable electronic device to play multimedia files in a shuffle mode;
reordering a playlist of the media-player application executed on the portable electronic device;
canceling a selection on a menu of an application executed on the portable electronic device; and
resetting a configuration of the application executed on the portable electronic device.

17. A portable electronic device, comprising:
a first ultrasound transmitter, sending ultrasonic signals;
a first ultrasound receiver, receiving reflected ultrasonic signals from an object, wherein the first ultrasound transmitter and the first ultrasound receiver are disposed to form a reference axis;
a second ultrasound transmitter or receiver for sending the ultrasonic signals or receiving the reflected ultrasonic signals, wherein the ultrasonic signals are sent at different frequencies or in different frequency patterns by the first ultrasound transmitter and the second ultrasound transmitter, and the second ultrasound transmitter or receiver and either the first ultrasound transmitter or the first ultrasound receiver are disposed to form another reference axis non-parallel and non-collinear to the reference axis, and the two reference axes further form a reference plane; and
a processing circuit, processing the reflected ultrasonic signals to obtain a time-frequency distribution thereof, determining a 1D gesture corresponding to projection loci of movements of the object on the reference axis according to the time-frequency distribution, and determining a 2D gesture corresponding to projection loci of movements of the object on the reference plane according to the time-frequency distribution.

18. The portable electronic device of claim 17, wherein the second ultrasound receiver is a directional microphone which provides one more reference axis non-coplanar to the other two reference axes, and the three reference axes further form a three-dimensional (3D) coordinate system, and the processing circuit further determines a 3D gesture corresponding to projection loci of movements of the object on the 3D coordinate system according to the time-frequency distribution.

19. The portable electronic device of claim 17, further comprising:
a third ultrasound transmitter or receiver for sending the ultrasonic signals or receiving the reflected ultrasonic signals,
wherein the ultrasonic signals are sent at different frequencies or in different frequency patterns by the first ultrasound transmitter, the second ultrasound transmitter, and the third ultrasound transmitter,
wherein the third ultrasound transmitter or receiver and one of the first ultrasound transmitter, the first ultrasound receiver, and the second ultrasound transmitter or receiver are disposed to form one more reference axis non-coplanar to the other two reference axes, and the three reference axes further form a 3D coordinate system, and
wherein the processing circuit further determines a 3D gesture corresponding to projection loci of movements of the object on the 3D coordinate system according to the time-frequency distribution.

20. The portable electronic device of claim 17, wherein the projection loci of movements of the object on the reference axis comprise a single movement of the object sweeping in one direction.

21. The portable electronic device of claim 20, wherein the processing circuit further performs one of the following:
flipping to a next page or picture displayed by an electronic-book (E-book) or electronic-album (E-album) application executed on the portable electronic device; and
switching to a next or previous tune or video to be played by a media-player application executed on the portable electronic device.

22. The portable electronic device of claim 17, wherein the projection loci of movements of the object on the reference axis comprise a movement of the object towards the portable electronic device and a movement of the object away from the portable electronic device.

23. The portable electronic device of claim 22, wherein the processing circuit further performs one of the following:
turning on or off a screen of the portable electronic device;

returning a User Interface (UI) displayed on the screen to a desktop or a main menu;
switching on or off an application currently executed on the portable electronic device;
playing or pausing a multimedia file on the portable electronic device;
turning up or down a ring volume of the portable electronic device, or switching the portable electronic device from a ringing mode to a vibration mode; and
counting up or down a setting value of the application currently executed on the portable electronic device.

24. The portable electronic device of claim 17, wherein the projection loci of movements of the object comprise a movement of the object swinging in a circle.

25. The portable electronic device of claim 24, wherein the processing circuit further performs one of the following:
configuring a media-player application executed on the portable electronic device to play multimedia files in a shuffle mode;
reordering a playlist of the media-player application executed on the portable electronic device;
canceling a selection on a menu of an application executed on the portable electronic device; and
resetting a configuration of the application executed on the portable electronic device.

26. An ultrasound-based method for touchless gesture recognition by a portable electronic device, comprising:
sending ultrasonic signals via a first ultrasound transmitter;
receiving reflected ultrasonic signals from an object via a first ultrasound receiver, wherein the first ultrasound transmitter and the first ultrasound receiver are disposed to form a reference axis;
sending the ultrasonic signals or receiving the reflected ultrasonic signals via a second ultrasound transmitter or receiver, wherein the ultrasonic signals are sent at different frequencies or in different frequency patterns by the first ultrasound transmitter and the second ultrasound transmitter, and the second ultrasound transmitter or receiver and either the first ultrasound transmitter or the first ultrasound receiver are disposed to form another reference axis non-parallel and non-collinear to the reference axis, and the two reference axes further form a reference plane;
processing the reflected ultrasonic signals to obtain a time-frequency distribution thereof;
determining a 1D gesture corresponding to projection loci of movements of the object on the reference axis according to the time-frequency distribution; and
determining a 2D gesture corresponding to projection loci of movements of the object on the reference plane according to the time-frequency distribution.

\* \* \* \* \*